United States Patent Office 3,150,787
Patented Sept. 29, 1964

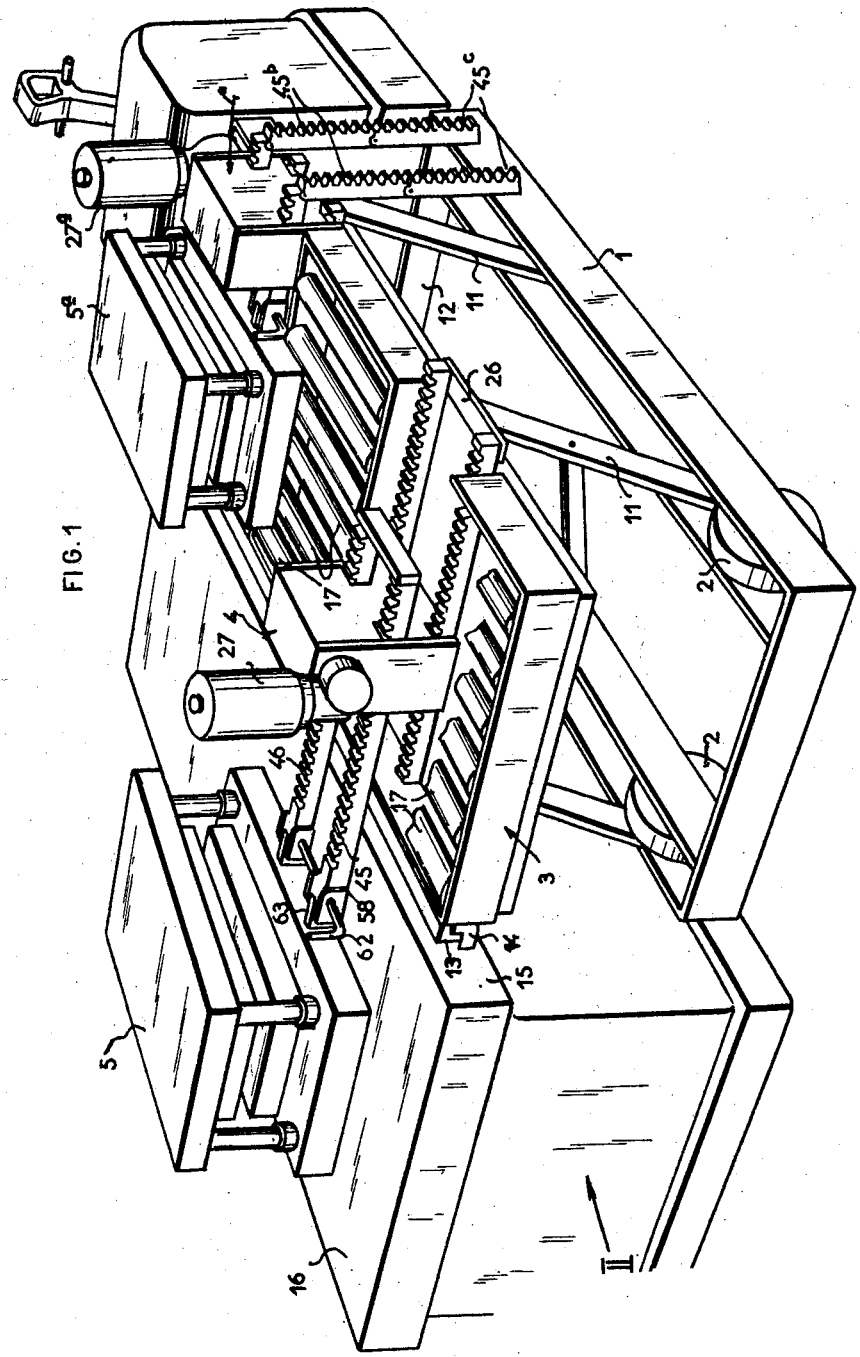

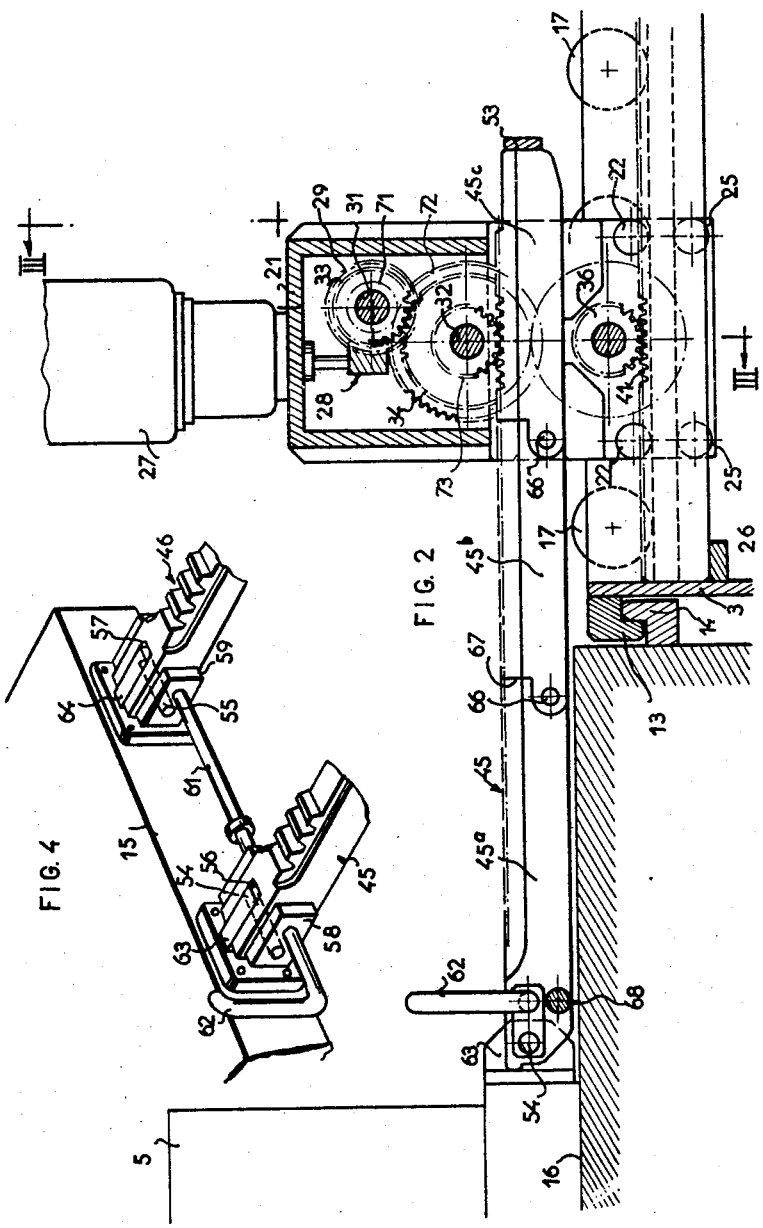

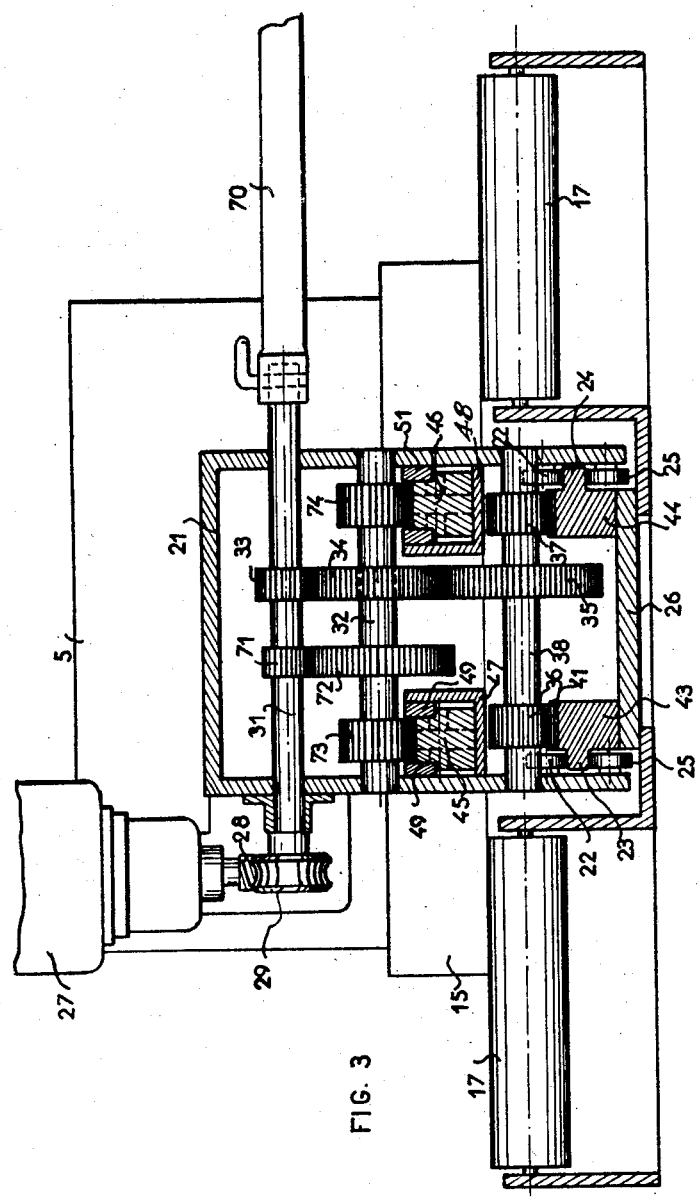

3,150,787
HANDLING APPARATUS
Théo Patrignani, Paris, France, assignor to Centre d'Etudes et d'Applications des Techniques de Production, Paris, France, a company of France
Filed July 25, 1961, Ser. No. 126,626
Claims priority, application France Aug. 8, 1960
3 Claims. (Cl. 214—514)

This invention relates to handling apparatus for placing massive objects on a flat surface, positioning the object at a desired location on the surface, and removing the object from the surface. The invention is of especial interest in connection with the handling of heavy press tool assemblies for large sized presses and will be described with specific reference to such use, even though it is not limited to such particular use but is of quite broad applicability.

In the use of large-sized presses for stamping, moulding and similar operations, it is frequently required to remove the heavy press tool assembly (including press plates and dies or the like) bodily from the press and reposition a different press tool assembly, as when passing from one production series to another. Handling means are currently available for depositing the press tool on the flat table surface of the press and for removing the press tool therefrom; however such conventional means have no provision for accurately locating the press tool on the press table when deposited thereon. Thus, such conventional press tool handling means usually comprise a wheeled truck having a platform adapted to receive a press tool, with means thereon for pushing the press tool from the platform to the press table when the truck has been brought alongside said table, or for pulling the press tool from the platform on to the press table, as with cables. After a press tool has been shifted from the truck platform to an edge portion of the press table the truck is wheeled away and the further positioning operations for bringing the press tool from the lateral position on the press table at which it was deposited, to its final location i.e. centered relatively to the press operating mechanism, have to be performed manually, using crowbars and the like. In view of the large size and mass of press tools for heavy presses these manual operations are tedious, fatiguing, and not without hazard of bodily injury.

It is an object of this invention to provide improved handling apparatus whereby a press tool, or other large heavy object, can be easily and quickly placed on a surface and accurately positioned thereon, and subsequently removed from said surface, using power means exclusively. Another object is to provide handling equipment for heavyweight objects including improved means for grasping the object so as to prevent any undesired displacements thereof and thus permit precise positioning of the object under power; an object is to provide improved latching means whereby the object to be positioned can be positively yet quickly secured to and disconnected from its grasping means; an object is to permit the heavy objects to be displaced with equal positiveness in opposite directions, i.e. to be both pushed and pulled, as for placing the object on a surface, and for subsequently removing it from the surface. Other objects will appear.

The invention in an important one of its aspects comprises handling apparatus for accurately positioning and removing massive objects on and from a flat surface, comprising a platform levelable with said surface; interengageable means on corresponding sides of said surface and said platform for locking the platform to the surface in contiguous coplanar relationship therewith to prevent separation between said corresponding sides; arm means on the platform mounted for horizontal displacement transversely to said contiguous sides; latching means on said arm means engageable with cooperating means on said object for positively connecting said object for two-way displacement with the arm means both from the platform towards the surface and from the surface towards the platform; and means on the platform for selectively imparting said displacements to the arm means.

An exemplary embodiment of the invention will now be described for purposes of illustration but not of limitation with reference to the accompanying drawings, wherein:

FIG. 1 is a general perspective view of a handling apparatus according to the invention shown positioned along side a press table and also showing a pair of press tool assemblies undergoing handling operations;

FIG. 2 is a larger-scale view, with parts broken away, being a partial side view as seen in the direction indicated by arrow II in FIG. 1;

FIG. 3 is a section on line III—III of FIG. 2; and

FIG. 4 is a larger scale perspective view showing a detail of FIG. 1.

Referring especially to FIG. 1, handling apparatus according to the invention is in the general form of a truck including a conventional frame 1 mounted on wheels 2. The general construction of the truck may be quite conventional and will not be described in detail. Thus motor means may be provided for imparting movement to the wheels 2. The truck frame 1 carries a platform 3 which is adjustable in vertical elevation, as by being carried thereon by way of parallel links such as 11; hydraulic lift actuator means would be normally provided for adjusting the elevation of the platform 3 to a desired value, on a level with the top surface 16 of a press table or the like in connection with which the apparatus is to be used. The platform 3 is shown as comprising two sets of rollers such as 17 journalled thereon in parallel spaced relation about axes parallel to the longitudinal dimension of the truck assembly. Each set of rollers 17 of the platform is adapted to support thereon an object to be handled, herein a press tool assembly such as 5 and 5a. In FIG. 1, press tool 5a is shown positioned on one of the sets of rollers of the platform 3 while the other press tool 5 is shown positioned on the press table 16.

Means are provided for locking the platform in position alongside the press table so that the upper plane defined by the platform rollers is substantially coplanar with the table surface and with corresponding side edges of the platform and table being substantially contiguous. The locking means are here shown as comprising a pair of angle elements 13 and 14 (also see FIG. 2), element 13 being secured to a side of the platform 3 with its flange directed downwardly, and element 14 being secured to a side of table 16 with its flange directed upwardly. Thus after the elevator truck has been brought alongside the press table, the platform can be raised a small amount through its hydraulic lift system and then lowered so as to engage the depending flange of angle 13 over the upstanding flange of angle 14, whereupon the platform 3 is positively locked to the press table and cannot be laterally separated therefrom, although it can still be displaced longitudinally to the table.

Referring now especially to FIGS. 2 and 3, associated with each set of rollers 17 adjacent one end of the set, is a pair of rails 43 and 44 extending in parallel spaced relation transversely of the platform and suitably supported thereon as by brackets (see FIG. 3), with the rails 43–44 being interconnected at their ends by spacers or cross members 26 secured to their under surfaces. Each rail 43, 44 has a flange 23, 24 respectively directed horizontally outward from a side thereof, and serving as a trackway. Each pair of trackways thus provided serves for the transverse support and displacement across the platform of a related handling unit, generally designated 4 or 4a in FIG. 1, and comprising a casing 21 in which is journalled a pair of upper rollers 22 engaging the upper surfaces of flanges 23, 24 and a pair of lower rollers 25 engaging the under surfaces of said flanges. The rollers 22 and 25 are journalled on pivot pins projecting inwardly from the side walls of casing 21 near the base thereof. The provision of the upper and lower rollers 22 and 25 engaging the opposite surfaces of the track flanges 23 and 24 ensures positive guidance of the casing 21 and opposes any tendency thereof to overturn under the couple created by the weight of the object being handled.

Each of the handling units 4, 4a is self-propelled along its tracks 23, 24 and is powered by a related reversible electric motor 27 mounted at the top of the unit. The top surfaces of the rail members 43 and 44 have racks formed or secured, thereto, and the racks are engaged by related pinion gears 36, 37 secured on a common shaft 38 journalled across the casing 21. The drive chain from motor 27 to drive shaft 38 comprises a worm 28 secured on the motor shaft, a wormgear 29 meshing with the worm and secured on the projecting end of a shaft 31 journalled across casing 21, a pinion gear 33 secured on shaft 31, a gear 34 meshing with pinion 33 and freely rotatable on an intermediate shaft 32 journalled across the casing, and finally a gear 35 secured on drive shaft 38 between pinions 36 and 37 and meshing with gear 34.

Each handling unit 4, 4a further includes means for both pushing and pulling a press tool assembly such as 5, and such means comprise a pair of rack arms 45, 46 supported in parallel spaced relationship above the respective rack rails 43, 44. The rack arms 45 and 46 are slidable in guide channels 47, 48 secured to the opposite inner sides of the casing 21. As shown, the guide channels each have a pair of wear-taking strips 49 and 51 respectively, secured near opposite sides thereof at the top of the channel and engaging complementary longitudinal bearing surfaces formed near the top of each rack arm 45, 46 to reduce wear. End spacer members such as 53 are shown for interconnecting both rack arms 45, 46 at the rear ends thereof, while the front ends of the rack arms are provided with latching means for connection with a press-tool assembly 5 or 5a. As shown, see especially FIG. 4, each rack arm 45, 46 is formed with a vertical slot 56, 57 in its outer end, each being adapted to receive therein a related one of two spaced lugs 63, 64 projecting from the base of press tool 5. The side walls of slots 56, 57 and the lugs 63, 64 are formed with aligned holes. A pair of latch pins 54, 55 are adapted to extend through the holes in both sides of the slot 56 or 57 in each of the rack arms 45, 46 and through the hole in the intermediate lug 63 or 64 for locking the press tool to the rack arms. Both latch pins 54, 55 project in similar directions from the ends of plates 58, 59 secured to spaced points of a latching rod 61 which extends slidingly through aligned holes formed in the rack arms 45, 46 and is parallel to the common geometrical axis of the latch pins. A handle 62 is secured to an outer end of the latching rod 61. It will be clear that with the arrangement described, actuation of handle 62 to displace the latching rod 61 axially leftward or rightward according to FIG. 4, will withdraw or project both latch pins 54, 55 out of or into the cooperating aligned holes in both rack arms 45, 46 and lugs 63, 64, thereby respectively to release the press tool from the rack arms or connect it therewith. The resulting latching arrangement is extremely convenient since it requires but a short amount of displacement of the latching means in either direction to obtain a positive and reliable latching engagement, or release. Also the latching arrangement remaining at all times connected with the rack arms is in no danger of being mislaid or dropped.

The rack arms 45 and 46 are desirably each formed in three interpivoted sections such as 45a, 45b and 45c (FIG. 2) interconnected by pivots 66 and formed with mating transverse end surfaces or shoulders 67 interengageable as between adjacent sections in the extended or aligned condition of said sections to define accurate alignment between them and permit the transfer of compression forces between the aligned sections as though they formed a single unit. Thus, during relative displacement of the rack arms with respect to the casings 21 through which said rack arms extend, between the retracted and extended conditions of the rack arms, one or both of the sections 45b and 45c positioned on the side of the platform remote from the press table can hang freely off the platform, as shown in FIG. 1 for the right-hand handling unit, and will not constitute a troublesome jutting obstacle on that side of the platform. Similarly in the forwardly extended or advanced condition of the rack arms, section 45a when not positioned on a press table 16 will hang rather than project horizontally outward. The free or latching ends of both rack arms 45 and 46 may be interconnected by a cross arm or bracing rod such as 68 in FIG. 2.

The advancing and retracting displacements of the rack arms 45, 46 relative to casing 21 are effected from the motor 27 simultaneously with the displacements of the casing 21 relative to the platform 3. For this purpose the racks formed or secured to the upper surfaces of arms 45, 46 are in mesh with respective pinion gears 73, 74 secured on the afore-mentioned intermediate shaft 32. A gear 72 secured on shaft 32 meshes with an additional pinion 71 secured on the motor-driven shaft 31. The dimensioning and gear-ratios are such that when the casing 21 of a unit 4, 4a travels its full amount of displacement relative to the platform 3, the rack arms 45, 46 also cover their full displacement stroke relative to the casing 21, in the same direction.

In operation, it may be assumed that it is desired to remove the press tool 5 positioned on the press table, and position in its place a different press tool 5a which has for this purpose been loaded on to the platform 3 at a platform loading station (not shown), and has been latched to the rack arms of the related handling unit 4a.

The truck is wheeled alongside the press table 16 and the platform 3 is raised to a level slightly above that of table 16 so as to permit interengagement of the angle 13 of the platform with the angle 14 of the press table, as previously explained, whereupon the surfaces of the press table and platform are on a common level. Electric motor 27 of handling unit 4 is started in operation to rotate in the direction producing advance of unit 4 towards the press table until the front ends of the rack arms 45 and 46 have engaged the lugs 63 and 64 of the press tool 5. If necessary the longitudinal position of the truck relative to the press table may be corrected as required to permit such engagement. Handle 62 is then actuated to engage the latch pins 54 with the lugs, whereupon the press tool is rigidly connected with the rack arms for two-way displacement therewith.

The direction of rotation of motor 27 is now reversed, using any suitable switching means for this purpose (not shown). The handling unit 4 is now traversed in the opposite direction, away from the press table, and in so doing pulls the press tool 5 off the press table and on to the platform rollers 17 which are at a common vertical elevation therewith. The platform 3 is lifted by a very small amount using the hydraulic lift means so as to reduce the pressure on the angle 14 and the truck is wheeled forward so as to bring the replacement press tool 5a substantially to a position corresponding to the final desired position thereof on the press table. Positioning stops (not shown) are preferably provided on the press table and platform for accurately defining the longitudinal position of the truck both in respect to press tool 5 and to press tool 5a. The platform is then lowered back to its level elevation, and the motor 27a of handling unit 4a is operated to advance unit 4a toward the press table. Unit 4a as it advances pushes the press tool 5a off the platform rollers 17 and on to the press table 16. In view of the positive attachment of the press tool with the rack arms, through the latching means previously described, it can be easily and positively conveyed to its desired position on the press table. Thus, assuming the press tool has been erroneously positioned somewhat too far on the press table, it can easily be returned to its proper location by simply reversing the motor 27a, this possibility being a consequence of the rigid attachment provided according to the invention between the handling arms such as 45, 46 and the handled article, whereby the latter can be both pushed and pulled.

The elements 45b and 45c of the rack arms are gradually moved from their vertical hanging position to the horizontal aligned position as they enter the casing 21 of the corresponding handling unit during advance of the latter towards the press table.

It will further be noted that since each press tool is held at two spaced points thereof by the related ends of the respective rack arms, it is fully guided during its displacements and undesirable pivotal or angular displacements thereof are positively prevented. After the press tool has been positioned at the desired location on the press table, handle 62 is actuated to release the latches, the handling unit and rack arms are restored to their initial positions, the platform 3 is raised slightly and disengaged from the press table, and the truck is driven away.

The dual handling arrangement shown and described is especially advantageous in view of the further possibility made available of using both handling units simultaneously in the handling of especially large and heavy objects, e.g. press tools of unusual size. Such a press tool would then be provided with four lugs such as 63 and 64 rather than just the two shown, so positioned as to be simultaneously engageable in the slots of both pairs of rack arms 45, 46 of both units 4 and 4a. In such operation, it is evidently impossible to remove one press tool and replace it with another press tool using a single truck according to the invention and in a single two-step operation of the kind above described. One truck would have to be used for each press tool, or the press tool removed from the press table may be temporarily placed in an intermediate storage while the other press tool is being positioned.

For synchronizing the movements of both handling units in the type of operation just described, a convenient procedure is to couple both shafts 31 in the respective units by means of a coupling bar 70 (FIG. 3) provided with means for easily and quickly connecting it with both shafts 31 when both handling units 4 and 4a are to be operated synchronously, and for removing said coupling bar when separate operation of both units is again desired.

Various changes and modifications may be made in the single embodiment illustrated and described without departing from the spirit of the invention. Thus, while the dual handling arrangement shown is of particular advantage where the handling operations to be performed involve the replacement of one object by another object, as herein described, it would clearly lie within the scope of the invention to provide a single handling unit such as 4 and associated equipment per truck. Apparatus according to the invention may be provided independently of the supporting truck shown, being arranged e.g. for attachment upon a standard elevator truck or other standard, handling equipment unit. Also, while the embodiment of the invention shown was especially designed for convenient use with a specific type of object to be handled, viz. press tools, the details of construction may of course be modified to suit requirements where other types of objects are to be handled.

What is claimed is:

1. Handling apparatus for positioning and removing objects on and from a flat surface, comprising a platform; means for effecting vertical movement of said platform with respect to the surface; interengageable means on corresponding longitudinal sides of said surface and platform for locking the platform to the surface in contiguous coplanar relationship therewith; rack means on the platform extending in a transverse direction thereof; a member having gear means journalled therein and meshing with said rack means for transverse displacement of the member across the platform on rotation of the gear means; further rack means spaced above said platform and means guiding said further rack means for displacement relative to the member in said transverse direction; further gear means journalled in said member and meshing with the further rack means; drive means on said member and gearing rotated by said drive means and rotating both said first and said further gear means for simultaneously imparting to said member a transverse displacement relative to the platform in a selected one of two opposite directions and imparting to said further rack means a transverse displacement relative to the member in the same one of said directions; and latching means on said further rack means engageable with cooperating means on said object for positively connecting said object for two-way displacement with the rack means from the platform towards the surface on rotation of the drive means in one of said directions and from the surface towards the platform on rotation of the drive means in the opposite direction.

2. Handling apparatus for positioning and removing objects on and from a flat surface, comprising a platform; means for effecting vertical movement of said platform with respect to the surface; interengageable means on corresponding longitudinal sides of the surface and platform for locking the platform to the surface in contiguous coplanar relationship therewith; transverse track means on the platform and a member displaceable thereon; a pair of parallel spaced transversely extending arms displaceable relative to said member above and parallel to said track means; latching means on said arms engageable with cooperating means on said object for two-way displacement of the object with said arms; power means supported on the member; drive means operated from said power means and operative for simultaneously displacing said member in either one of two opposite directions relative to the platform along said track means, and displacing said arms in a corresponding direction relative to the member, said drive means comprising a pair of racks on the platform extending parallel to said track means; a pair of gears journalled in said member and meshing with said racks; a further pair of racks supported on said respective arms; a further pair of gears journalled on said member and meshing with said further racks; and gearing rotated from said power means and simultaneously rotating said first-named and said further gears in opposite directions.

3. Apparatus as claimed in claim 1, wherein said further rack means comprise a plurality of pivotally interconnected sections having abutted end surfaces for alignment of said sections in an operative condition of the rack means and adapted to be pivoted by gravity to a depending condition when inoperative.

(References on following page)

References Cited in the file of this patent

UNITED STATES PATENTS

| | | |
|---|---|---|
| 1,773,163 | Becker | Aug. 19, 1930 |
| 1,896,063 | Bottini | Feb. 7, 1933 |
| 2,493,493 | Mariano | Jan. 3, 1950 |
| 2,756,885 | Ackermann | July 31, 1956 |
| 2,856,085 | Ryan | Oct. 14, 1958 |
| 2,873,502 | Hodges et al. | Feb. 17, 1959 |
| 2,880,897 | Wilms et al. | Apr. 7, 1959 |
| 2,945,604 | Kroll et al. | July 19, 1960 |
| 2,987,205 | Draxler | June 6, 1961 |

FOREIGN PATENTS

| | | |
|---|---|---|
| 292,957 | Italy | Feb. 2, 1932 |